(12) United States Patent
Sommerlade et al.

(10) Patent No.: US 9,992,398 B2
(45) Date of Patent: Jun. 5, 2018

(54) OPTICAL SIGHTING

(71) Applicant: OXFORD METRICS PLC, Yarnton, Oxfordshire (GB)

(72) Inventors: Eric Sommerlade, Oxford (GB); Emmet Spier, Oxford (GB); Julian Morris, Oxford (GB)

(73) Assignee: OXFORD METRICS PLC, Oxon (GB)

( * ) Notice: Subject to any disclaimer, the term of this patent is extended or adjusted under 35 U.S.C. 154(b) by 184 days.

(21) Appl. No.: 15/033,006

(22) PCT Filed: Oct. 24, 2014

(86) PCT No.: PCT/GB2014/053183
§ 371 (c)(1),
(2) Date: Apr. 28, 2016

(87) PCT Pub. No.: WO2015/063460
PCT Pub. Date: May 7, 2015

(65) Prior Publication Data
US 2016/0286107 A1    Sep. 29, 2016

(30) Foreign Application Priority Data

Oct. 28, 2013   (GB) .................................. 1318990.7

(51) Int. Cl.
*H04N 5/225*     (2006.01)
*H04N 5/232*     (2006.01)
(Continued)

(52) U.S. Cl.
CPC ........... *H04N 5/2259* (2013.01); *G06T 7/248* (2017.01); *G06T 7/30* (2017.01); *G06T 7/73* (2017.01);
(Continued)

(58) Field of Classification Search
CPC ........................... H04N 5/2259; H04N 13/044
See application file for complete search history.

(56) References Cited

U.S. PATENT DOCUMENTS 4,942,035 A   7/1990 Churchill et al.
6,711,293 B1   3/2004 Lowe
(Continued)

FOREIGN PATENT DOCUMENTS

EP   2 192 546   6/2010
EP   2 375 376   9/2013
(Continued)

OTHER PUBLICATIONS

Badri et al.; Camera-to-Camera Mapping for Hybrid Pan-Tilt-Zoom Sensors Calibration; SCIA 2007.
(Continued)

*Primary Examiner* — Hung Dang
*Assistant Examiner* — Girumsew Wendmagegn
(74) *Attorney, Agent, or Firm* — Foley & Lardner LLP (57) ABSTRACT

Optical sighting is performed using plural optical sighting apparatuses that each comprise: a camera unit and a viewing system for viewing images. Geometric calibration of the camera units with respect to the imaged scene is performed by detecting features within captured images, generating descriptors from respective patches of the image at the features; detecting corresponding descriptors from different images, and deriving the geometric calibration from the positions in the respective images of the corresponding descriptors. A target location in a designator image captured at an earlier image-capture time is designated and a corresponding location relative to the current image captured at the current time is identified from the geometric calibration. A viewing system indicates where the corresponding location lies relative to the current image.

18 Claims, 9 Drawing Sheets

(51) Int. Cl.
  H04N 5/272    (2006.01)
  G06T 7/80     (2017.01)
  G06T 7/30     (2017.01)
  G06T 7/73     (2017.01)
  G06T 7/246    (2017.01)
(52) U.S. Cl.
  CPC ............ *G06T 7/80* (2017.01); *H04N 5/2252* (2013.01); *H04N 5/23293* (2013.01); *H04N 5/272* (2013.01); *G06T 2207/10012* (2013.01); *G06T 2207/20016* (2013.01); *G06T 2207/30212* (2013.01); *G06T 2207/30244* (2013.01)

(56) References Cited

U.S. PATENT DOCUMENTS

| | | | |
|---|---|---|---|
| 2011/0043620 | A1 | 2/2011 | Svanholm et al. |
| 2013/0070108 | A1 | 3/2013 | Aerts et al. |
| 2014/0218550 | A1* | 8/2014 | Chuang .............. H04N 5/23248 348/208.6 |
| 2015/0146015 | A1 | 5/2015 | Sommerlade et al. |

FOREIGN PATENT DOCUMENTS

| | | |
|---|---|---|
| GB | 2 501 684 | 11/2013 |
| WO | WO-2013/164595 | 11/2013 |

OTHER PUBLICATIONS

Del Bimbo et al., "Exploiting distinctive visual landmark maps in pan-tilt-zoom camera networks", Computer Vision and Image Understanding, vol. 114, No. 6, 2010, pp. 611-623.
Hartley et al., "Multiple View Geometry in computer vision", Cambridge University Press, Second Edition, 2003.
International Search Report and Written Opinion on PCT/GB2014/053183, dated Feb. 26, 2015.
Lindeberg, "Feature detection with automatic scale selection", International Journal of Computer Vision 30 (2): 79-116 , 1998.
Lowe, "Object recognition from local scale-invariant features", Proceedings of the International Conference on Computer Vision. 2. pp. 1150-1157, 1999.
Muja and Lowe, "Fast approximate nearest neighbors with automatic algorithm configuration", International Conference on Computer Vision Theory and Application VISSAPP '09, pp. 331-340. INSTICC Press, 2009.
Torr et al., "MLESAC: A new robust estimator with application to estimating image geometry", Computer Vision and Image Understanding, 78:138-156, 2000.
Yeh et al., "Effects of Frame of Reference and Viewing Condition on Attentional Issues with Helmet Mounted Displays", 1998, pp. 1-76.
Yeo et al; Coding of Image Feature Descriptors for Distributed Rate-efficient Visual Correspondences; International Journal of Computer Vision, 2011, 94:267-281.

* cited by examiner

OPTICAL SIGHTING

CROSS-REFERENCE TO RELATED APPLICATIONS

This application is the 35 U.S.C. § 371 National Stage Application of PCT International Application No.: PCT/GB2014/053183, filed Oct. 24, 2015, which claims the benefit of British Application No. 1318990.7 filed Oct. 28, 2013, each of the contents of which are incorporated herein by reference in their entireties.

The present invention relates to optical sighting using a mobile optical sighting apparatus that includes a camera unit and a display device.

The present invention has a range of applications in which an optical sighting apparatus is used to image a scene repeatedly, for example when the optical sighting apparatus is used as a scope in a similar manner to a telescope or binoculars. In such applications it is often desired by a user of the optical sighting apparatus to view a common scene over a period of time, so that the individual images are viewed at different times. As between the image-viewing times, generally the optical sighting apparatus will be in varying locations and/or the optical apparatus will have varying optical parameters (such as focal length, field of view, etc.) with the result that the viewed images will be of different portions of the scene. Whilst observing a scene, there are many scenarios in which the user may desire to direct the optical apparatus back towards a previously imaged location in the scene. For example, the user may simply wish to return to a point of interest that was previously observed. Similarly, standard techniques for performing reconnaissance involve scanning gaze around one or a series of points to build up a picture of the overall scene that is wider than the field of view. However, it can be very difficult for a user to remember precise locations, especially if the scene is complex and especially as the field of view is reduced to obtain greater magnification. Often, it can be necessary for the user to reduce the magnification or even observe the scene by eye before zeroing in on a desired location that was previously observed. It would be desirable to assist a user in these circumstances.

According to an aspect of the present invention, there is provided a method of optical sighting implemented in an optical sighting apparatus that comprises: a camera unit comprising a lens system arranged to focus images of respective portions of a scene within the field of view of the lens system, and an image sensor arranged to capture images focused by the lens system; and a viewing system arranged to provide viewing of the images focused by the lens system by a user, the method comprising:

detecting features within each of plural images captured by the image sensor, being the current image captured at the current time and one or more earlier images captured at earlier image-capture times;

generating descriptors in respect of each of the plural images from patches of the respective images at the positions of each detected feature;

detecting corresponding descriptors generated in respect of the plural images;

deriving the geometric calibration of the camera unit at the current time and at the image-capture time of one of the one or more earlier images, referred to as a designator image, with respect to the scene from the positions in the respective images of the features corresponding to the detected, corresponding descriptors generated in respect of the plural images;

in respect of at least one target location in the designator image, identifying, from the derived geometric calibration of the camera unit at the current time and at the image-capture time of the designator image, a corresponding location relative to the current image that corresponds to a target location in the scene that itself corresponds to the target location in the designator image; and indicating in the viewing system where the corresponding location lies relative to the current image.

Accordingly the present invention is based on an appreciation that images captured by the camera unit of the optical sighting apparatus at an earlier image-capture time may be used to sight an object in a scene being imaged at the current time. As an optical instrument, a camera unit has the same basic ability to measure relative angles as a theodolite and is a truly portable device. The present invention employs a technique that allows a geometric calibration of the camera units to be derived from plural images. A target location is designated in a designator image captured at an earlier image-capture time, for example a target location at a predetermined position within that image, such as a central location of the designator image that may be identified to the user by displaying cross-hairs on the designator image, or the boundary of the field of view of the lens system. The geometric calibration allows identification of a corresponding location in the current image captured at the current time. Where that corresponding location lies may then be indicated in the viewing system during display of the current image.

The designator image may be designated on the basis of user input, for example through a user interface of the optical sighting apparatus. The one or more earlier images may consist of a single earlier image so that the plural images used together consist solely of the designator image and the current image to minimise image processing. Alternatively, the one or more earlier images may include further images, which advantageously may improve accuracy and/or allow operation with a reduced degree or even no overlap between the current image and the designator image, by making use of overlap between other images.

In the case that the corresponding location is inside the field of view of the lens system at the current time when the current image is captured, then the corresponding location may be indicated by being superimposed on the current image. However, it is a particular advantage that the sighting may still be performed even in the case that the corresponding location is outside the field of view of the lens system at the current time, provided that there is sufficient overlap between the portions of the scene imaged at the different image-capture times to allow the geometrical calibration to be performed. In this case, the corresponding location may be indicated by displaying a pointer towards the corresponding location, and optionally a distance measure. That allows the user viewing the current image using the viewing system of the optical sighting apparatus to change the field of view of the camera unit, for example by changing the pan, tilt or zoom (PZT) of the camera unit, so as to image the corresponding location.

It is a particular advantage that the method still works in the case that an object, that was present at the target location at the time the user designates it in the designator image, disappears by the current time at which the current image is captured. The target location may still be identified, because the method makes use of features that may in general lie across the images captured at different image-capture times, rather than relying on image information about the object itself. Thus, the user may record and return to the target location even when an object of interest has disappeared.

In order to derive the geometric calibration, the present invention utilises a particular technique in which features are detected within each of plural images at the different image-capture times, descriptors are generated in respect of each of the plural images from patches of the respective images at the positions of each detected feature and corresponding descriptors generated in respect of different images are detected. The geometric calibration of the camera units at the current time and at the image-capture time of the designator image with respect to the scene is derived from the positions in the respective images of the features corresponding to the detected corresponding descriptors generated in the plural images. It has been appreciated that such a technique may be used to obtain the geometric calibration in real time to a sufficient accuracy to allow the assisted sighting to be performed.

According to a further aspect of the present invention, there is provided a mobile optical sighting apparatus for performing optical sighting that implements a similar method.

Figure 1:
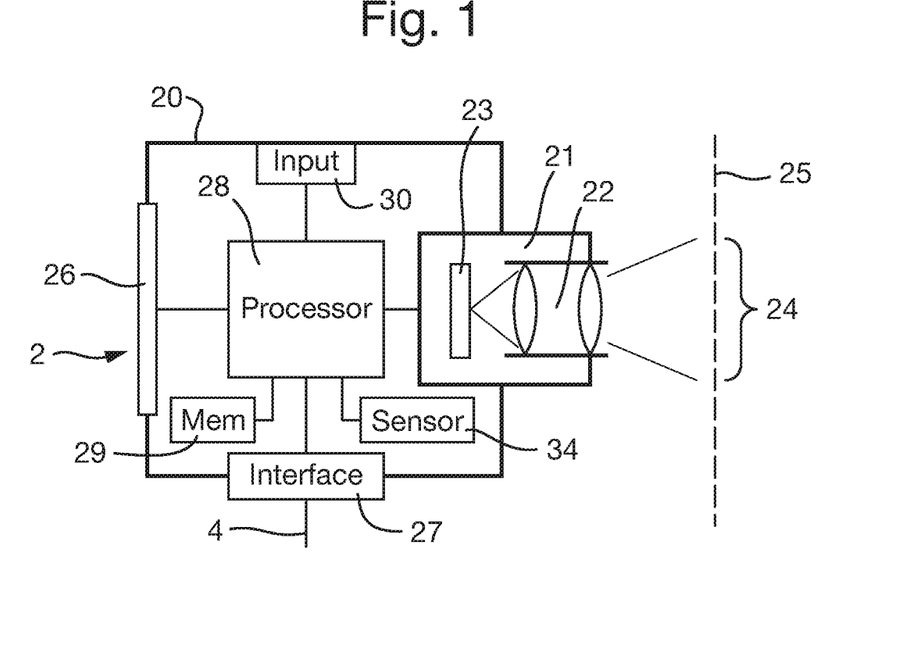
FIG. 1 is a diagram of an optical sighting apparatus.

To allow better understanding, an embodiment of the present invention will now be described by way of non-limitative example with reference to the accompanying drawings, in which:

FIG. 1 illustrates an optical sighting apparatus 2 that includes the following components housed in a housing 20.

A camera unit 21 comprises a lens system 22 and an image sensor 23 arranged in the focal plane of the lens system 22. The lens system 22 focuses an image of a portion 24 of a scene 25 within the field of view of the lens system 22 (as illustrated schematically in FIG. 1) onto the image sensor 23. The lens system 22 may be formed by any suitable optics, typically including several lenses. The lens system 22 may have a field of view that is adjustable, either manually by the user or automatically by the optical sighting apparatus 2 (in particular by the processing unit 28 described below).

The sensor element 23 may have any construction, for example being a CMOS (complementary metal-oxide semiconductor) device, and may operate in any suitable part of the electromagnetic spectrum, including visible light and infrared.

The optical sighting apparatus 2 includes a display device 26 that is capable of displaying images. The display device 26 may by of any suitable type, for example an LCD display. As described below, the display device 26 forms a viewing system that provides viewing of images focussed by the lens system 22, by displaying images that have been captured by the image sensor 23.

The optical sighting apparatus 2 includes a communication interface 27 for connection to the communications network 4. The communications interface 27 contains suitable elements for providing hardware and/or software elements for providing data communications over the communications network 4 in accordance with the communications protocol used. The communications network 4 may be of any type and operate in accordance with any suitable communications protocol. The communications network 4 is most typically a wireless network operating at radio frequencies, but may alternatively be a wireless network operating at other frequencies or a wired or optical network. The communications network 4 may use any communication protocol, for example TCP/IP. The communications network 4 may encrypt communicated data in order to preserve security.

The optical sighting apparatus 2 further comprises a processing unit 28 that is connected to the other components, including the camera unit 21, the display device 26 and the communications network 27. The processing unit 28 is configured to control the various elements of the optical sighting apparatus 2, including the following functions. The processing unit 28 supplies images captured by the image sensor 23 of the camera unit 21 receives images captured by the image sensor 23 of the camera unit 21, and may store these in a memory 29 of the optical sighting apparatus 2. The processing unit 28 may process such images.

The processing unit 28 also supplies the images to the display device 26 for display thereon. The processing unit 28 may overlay graphical elements on the image supplied to the display device 26, for example graphical elements indicating locations on the image, such as cross hairs at the centre, or symbols indicating the operational status of the optical sighting apparatus 2, such as the optical settings of the lens system 22 or the information on the status of the communications interface 27.

The processing unit 28 may be implemented by a processor executing an appropriate control program, although alternatively functions of the processing unit 28, for example image processing functions, may be implemented using appropriate hardware components, for example an FPGA (field programmable gate array) or ASIC (application specific integrated circuit).

The optical sighting apparatus 2 also comprises an input device 30 for receiving user inputs. The input device 30 is connected to the processing unit 28 to allow the operation controlled by the processing unit 28 to be controlled by the user on the basis of the user inputs. The input device 30 may take any suitable form, for example being a panel of keys, or being integrated with the display device 26 in the form of a touch-sensitive screen.

The optical sighting apparatus 2 having the arrangement described above may be used in a range of applications where it is desired for a user to observe a scene 25 by capturing plural images of respective portions 24 of that scene 25. In many uses, images will be captured repeatedly or continuously.

In typical applications, the optical sighting apparatus 2 is mobile, rather than being fixed. The optical sighting apparatus 2 may be configured to be portable by the user, for example manually or on a vehicle. Similarly, in accordance with the application the optical sighting apparatus 2 may be hand-held or mounted on a support.

Some examples of applications are as follows.

The optical sighting apparatus 2 may have a military application in which they are used to sight objects for targeting. The optical sighting apparatus 2 may be a weapons sight that is adapted to be connected to a weapon.

However, the optical sighting apparatus 2 may equally be applied to a range of non-military applications.

In one non-military application, the optical sighting apparatus 2 may be a hand-held scope, similar to a telescope or binoculars, used by a group of wildlife enthusiasts operating collectively to locate, observe, and record images of birds, animals, and other flora and fauna.

In another non-military application, the optical sighting apparatus 2 may be used to observe a scene from a set of moving vehicles on land, sea, air, or space. The observations may be undertaken for any purpose for which it is necessary to determine and control the overlap of images, including but not limited to targeting, scientific measurement, image mosaic generation.

Figure 2:
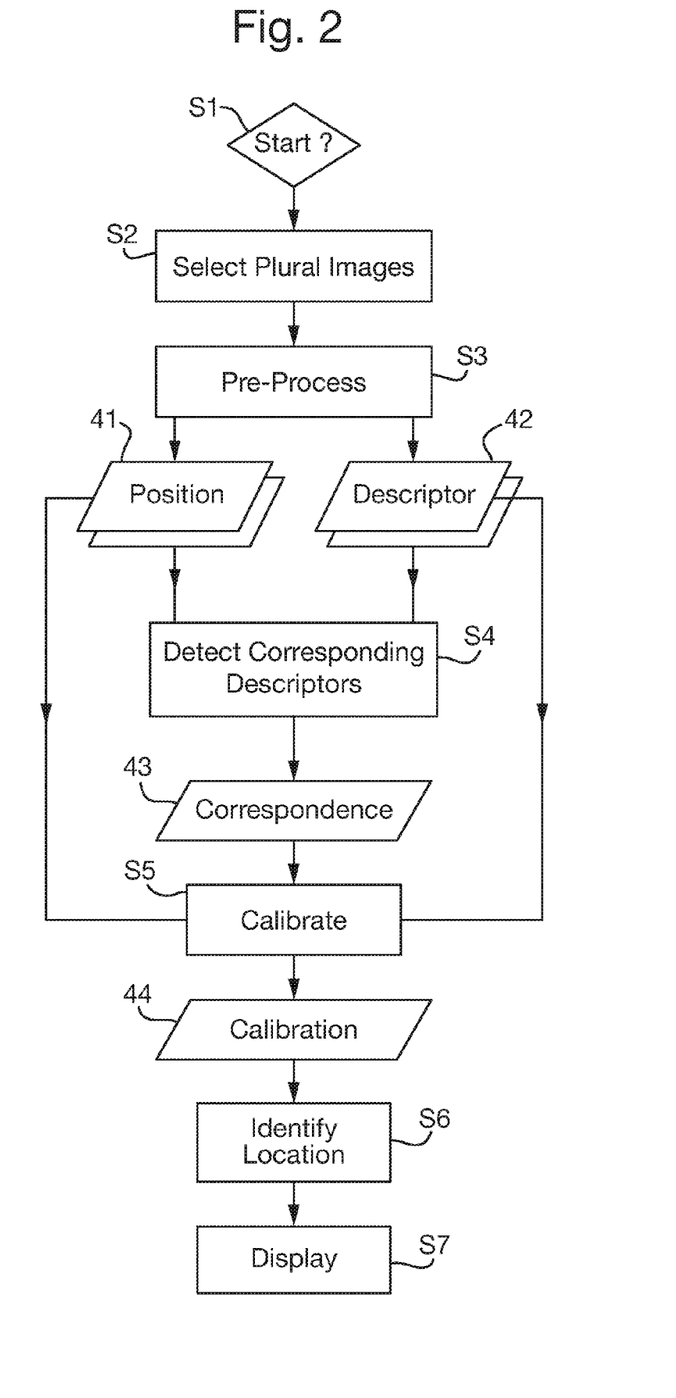
FIG. 2 is a flow chart of a method of optical sighting.

The optical sighting apparatus 2 is arranged to perform optical sighting using a method that is shown in FIG. 2 and will now be described. The method is performed by the processing unit 28 of the optical sighting apparatus 2.

The method involves the optical sighting apparatus 2 capturing plural images of respective portions 24 of the same scene 25. A target location in a designator image captured by the camera unit 21 is selected. The assisted optical sighting method has the purpose of identifying the corresponding location relative to a current image captured by the camera unit 21. That corresponding location corresponds to a target location in the scene 25 that itself corresponds to the target location designated in the designator image captured by the camera unit 21.

The following method is an example applied to a mode of operation of the optical sighting apparatus 2 in which, under the control of the processing unit 28, the camera unit 20 captures images continually, that is at periodic image-capture times, and the display device 26 displays the most current image, i.e. the image that has most recently been captured.

In step S1, a decision is made to start performing the method. This requires that a designator image has been selected on the basis of user input, that the user inputs using the input device 30. For example, the user may press a button to select the designator image as the image that is currently displayed. When a subsequent image is captured at an image-capture time later than that of the designator image, step S1 makes a decision to start performing the method. This method is performed on the current image captured at the current time. Step S1 may make this decision repeatedly, for example every time an image subsequent to the designator image is captured or intermittently for some of the subsequent images. In that case, the method is performed repeatedly.

In step S2, plural images are selected to be processed from the images that have been captured by the camera unit 2. There are two options for this.

A first option is that the plural images consist solely of the current image captured at the current time and the designator image that was selected by the user. In this option, the plural images include a single image captured at an earlier image-capture time than the current image, i.e. the designator image. In this option, the images captured at image-capture times intermediate the designator image and the current image are not used (although they may have been used in previous performances of the method). This reduces the amount of processing since only two images are processed.

A second option is that the plural images consist of the current image, the designator image, and additionally further images captured at an earlier image-capture time than the current image. The further images may be earlier images captured at image-capture times intermediate the current image and the designator image. In this case, the further images may be all the images captured at image-capture times intermediate the current image and the designator image, or may be a subset of them, sampled from image-capture times intermediate those of the current image and the designator image, for example every nth image captured after the designator image where n is greater than one. Additionally, or alternatively, the further images may include images captured at image-capture times before the designator image.

The use of further images allows the processing of the method discussed below to make use of overlap between the portions of scene in combinations of images other than the current image and the designator image. This may improve accuracy by increasing the information used in the processing. This may also allow operation with a reduced degree of overlap between the current image and the designator image, by allowing calibration to take advantage of overlap between other images. In an extreme case, the method could work with no overlap between the current image and the designator image, provided that the further images provide a chain of overlap allowing calibration between the current image and the designator image.

Figure 3:
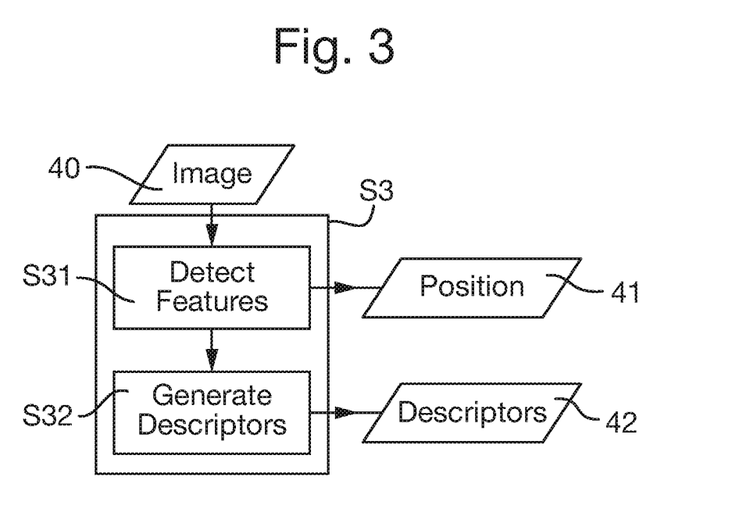
FIG. 3 is a flow chart of a pre-processing method used within the method of optical sighting.

In step S3, the plural images selected in step S2 are each pre-processed by a method shown in FIG. 3 and comprising two steps S31 and S32 as follows.

In general terms, the sighting is facilitated by extraction and comparison of areas of the image. In principle, these could range in size from the whole image, to a region containing an actual object that is observed, down to a small kernel of pixels. Given expected changes in viewpoint and lighting conditions in the context of use of the optical sighting apparatus 2 in a range of environments, typically outdoors, a sparse approach is chosen.

In step S31, the image 40 that is being pre-processed is analysed to detect features within that image 40. The position of each feature within the image 40 is output as position data 41. In general, any type of image feature may be detected, using any of a range of existing feature detectors known for image processing. Such features are conventionally also referred to as interest points or key points. As to the choice of feature to be detected a priority here is speed, since the whole image 40 must be scanned. Given the typical currently available processing speeds, the general aim is to produce several hundred features distributed as evenly as possible over the image. If the image 40 has a relatively high-resolution, then the image may be down-sampled beforehand to reduce the processing burden.

The exact nature of the features is tuned towards quantity in typical images, ease of acquisition, and reliable localization.

The feature detectors are advantageously chosen to be invariant to one or more of scale, view angle (including rotation about the device's optical axis), intensity, colour and other potential variations due to the viewer and target locations, attitude, and the observer's equipment.

Scale-invariance and rotation-invariance may be achieved by detecting the features as maxima and/or minima in the differences of different scale spaces of the image 40. As the different scale spaces of the image 40 represent the content of the image 40 at different scales, such features are effectively maxima of curvature in the image 40, in any direction, and at different resolutions including the original resolution coarser resolutions. One possible approach for this is as follows.

Figure 4:
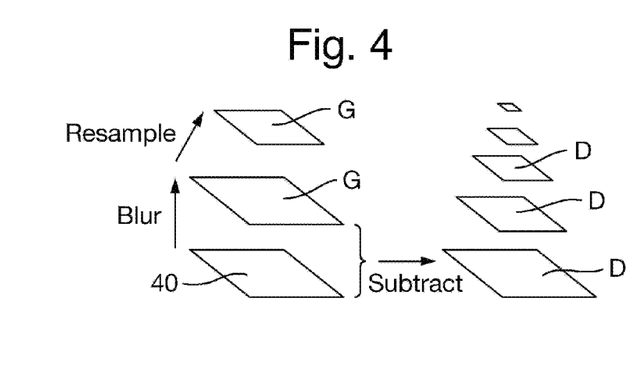
FIG. 4 is a schematic diagram of deriving differences-of-blurs images at different scales.

The image 40 represented by $I(x,y)$ is convolved with Gaussian filters represented by $G(x,y,k\sigma)$ at different scales $k\sigma$ to derive the scale spaces of the image 40 represented by $L(x,y,k\sigma)$ in accordance with the equation:

$$L(x,y,k\sigma)=G(x,y,k\sigma)*I(x,y)$$

The differences $D(x,y,\sigma)$ at different scales $\sigma$ between the scale spaces $L(x,y,k\sigma)$ of the image, hereinafter referred to as the differences-of-blurs image $D(x,y,\sigma)$, are taken in accordance with the equation:

$$D(x,y,\sigma)=G(x,y,\sigma)-G(x,y,k\sigma)$$

Hence the differences-of-blurs image $D(x,y,\sigma)$ between scales $k_i\sigma$ and $k_j\sigma$ is just the difference of the scale spaces of the image at scales $k_i\sigma$ and $k_j\sigma$.

This method is illustrated schematically in FIG. 4.

Figure 5:
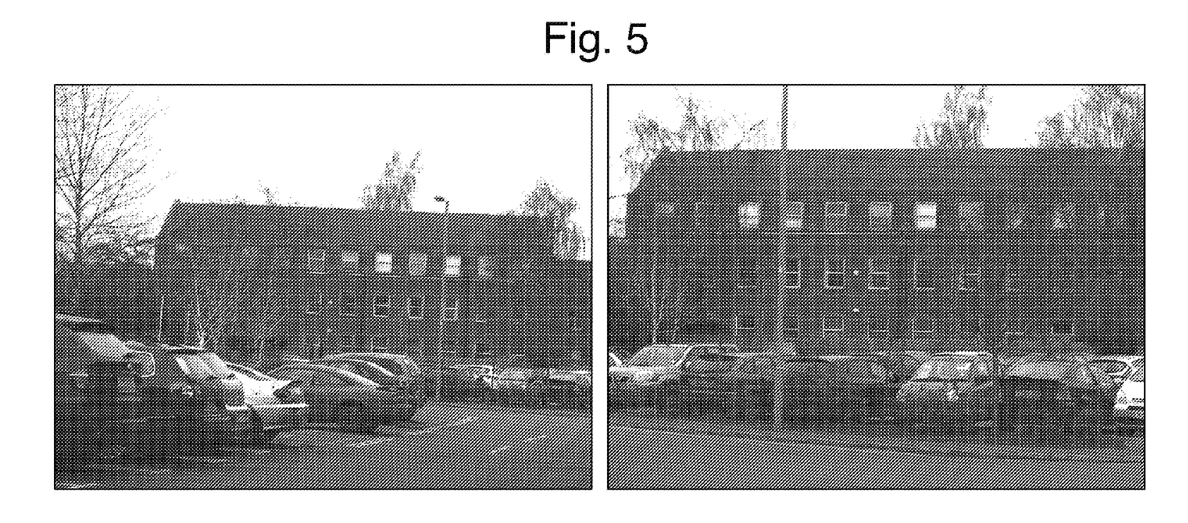
FIG. 5 shows two images of overlapping portions of a common scene captured by an optical sighting apparatus at two different image-capture times.
Figure 6:
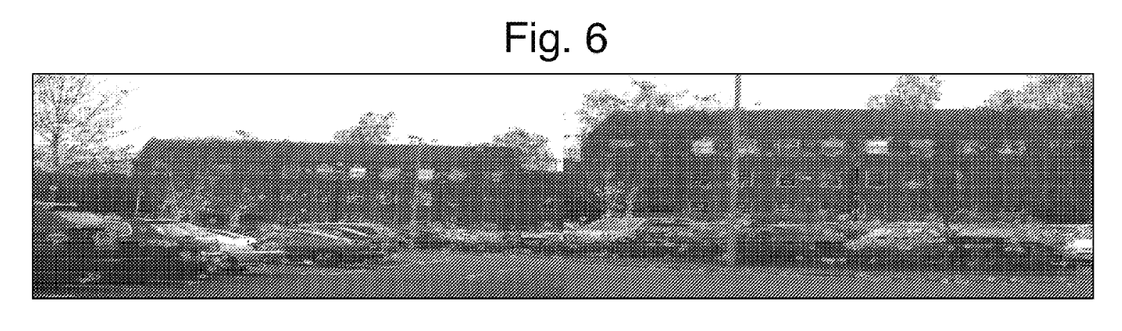
FIG. 6 shows the two images of FIG. 5 with detected features identified.

An example of the detection of features using this method is shown in FIGS. 5 and 6. In particular, FIG. 5 shows two images taken by different optical sighting apparatus 2 of overlapping portions of a scene including a building, and FIG. 6 shows the same images with location of detected features identified by circles.

Maxima and/or minima in the differences-of-blurs image $D(x,y,\sigma)$ at different scales $\sigma$ are detected as the features. This may be done by comparing each pixel in the differences-of-blurs image $D(x,y,\sigma)$ to its eight neighbors at the same scale and nine corresponding neighboring pixels in each of the neighboring scales. If the pixel value is the maximum or minimum among all compared pixels, it is selected.

Further details that may be applied in the present method are disclosed in Lowe, "Object recognition from local scale-invariant features", Proceedings of the International Conference on Computer Vision. 2. pp. 1150-1157, 1999 and in U.S. Pat. No. 6,711,293 (both incorporated herein by reference).

Such a feature detection step is a variation of one of the blob detection methods disclosed in Lindeberg, "Feature detection with automatic scale selection", International Journal of Computer Vision 30 (2): 79-116, 1998 (incorporated herein by reference), that involve detecting scale-space extrema of the scale normalized Laplacian, that is detecting points that are local extrema with respect to both space and scale, in the discrete case by comparisons with the nearest 26 neighbours in a discretized scale-space volume. The difference of Gaussians operator can be seen as an approximation to the Laplacian, here expressed in a pyramid setting. Such blob detection methods as disclosed in Lindeberg may be applied for feature detection in the present invention.

An alternative approach for detecting features is to use the so-called Maximally Stable Extremal Regions (MSER) technique. The idea behind MSER is to find relatively large regions that exhibit homogeneity in colour or texture. This kind of imagery is often found in man-made environments, if one thinks of letters or labels. MSER are described by a neighbourhood of pixels which have a constant intensity change along its boundaries, and can be implemented very efficiently. The output of this feature detector in MSER is the centre of such regions.

In step S32, there are generated a set of descriptors in respect of the image 40 associated with the respective features within the image 40. In particular, each descriptor is generated from a respective patch of the image at the position of the associated feature. Descriptor data 42 representing the set of descriptors is output.

The purpose of the descriptors is to provide information about the region of the image at each of the detected features that allows identification of these features in other images. Whereas the features are selected for localization, the descriptor is aimed at distinctiveness.

As to the patch of pixels around each detected feature used for generating the descriptors, the size is selected as a balance between the discriminatory information contain that increases with size and perspective distortions between views that increase with size and degrade the comparison of the descriptors. Due to noise and actual similarity of the input images, the descriptors can be arbitrarily close, despite stemming from an originally different point.

The descriptors may be generated in a range of different ways. At simplest, the descriptor could simply be the image data of the patch, but that reduces the ability to detect matching descriptors in different images. Indeed, the problem with making direct comparisons (cross-correlation) of patches around features is that they appear different with changes of intensity, colour balance, scale, and rotation. Accordingly, the descriptors are preferably a transform of the patch.

Advantageously, the descriptors are chosen to be invariant to one or more of scale, view angle (including rotation about the device's optical axis), intensity, colour and other potential variations due to the viewer and target locations, attitude, and the observer's equipment. A number of methods are known for generating such descriptors, some examples of which are described further below.

One possibility is that the descriptor is generated using the so-called Scale-Invariant Feature Transform (SIFT) which provides scale-invariance and rotation-invariance. SIFT descriptors are derived as follows from features obtained by detecting the features as maxima and/or minima in the differences of different scale spaces of the image 40, as follows with reference to the example shown in FIGS. 7a to 7c. This step is performed on the scale space of the image 40 represented by $L(x,y,k\sigma)$ closest in scale to the scale of the detected feature, so that the descriptors are derived from respective patches of the image in the scale space of the image in which the maxima and/or minima in the differences of samples is detected. This step derives descriptors that comprise histograms of image gradients in different directions across the respective positions of the detected features.

Figure 7A:
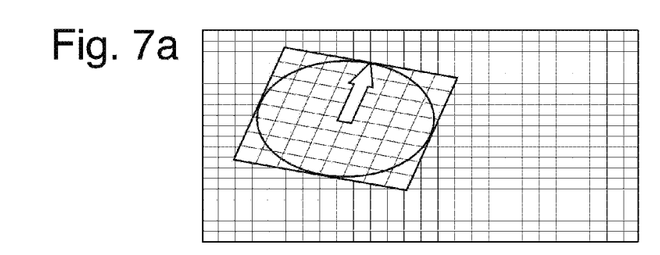
FIGS. 7a to 7c illustrate the derivation of a SIFT descriptor.
Figure 7B:
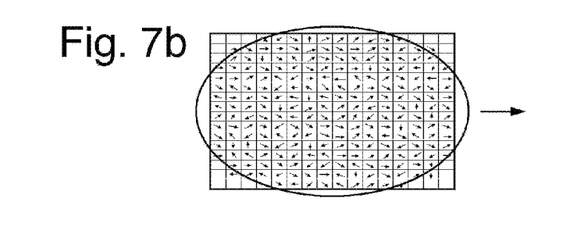

As shown in FIG. 7a which illustrates a patch 50 of the scale space of the image 40 used in respect of a feature at position 51, there is first derived the dominant gradient 52 in the image patch 50. As shown in FIG. 7b, the patch is orientated to this dominant gradient in the image patch around the feature. This achieves invariance to the rotation in the image without compromising information by relying on rotational invariant measures, which in turn facilitates the identifiability of a descriptor.

Figure 7C:
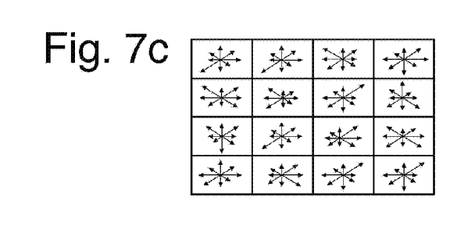

Next, as shown in FIG. 7c for an example in which the patch 50 is a 16×16 pixel region of the scale space of the image 40, a set of orientation histograms are created on 4×4 pixel neighbourhoods with 8 bins each. These histograms are computed from magnitude and orientation values of samples in a 16×16 region around the keypoint such that each histogram contains samples from a 4×4 subregion of the original neighborhood region. The magnitudes are further weighted by a Gaussian function with equal to one half the width of the descriptor window. The descriptor then becomes a vector of all the values of these histograms. Since there are 4×4=16 histograms each with 8 bins the vector has 128 elements. This vector is then normalized to unit length in order to enhance invariance to affine changes in illumination. To reduce the effects of non-linear illumination a threshold of 0.2 is applied and the vector is again normalized.

Further details of SIFT that may be applied in the present method are disclosed in Lowe, "Object recognition from local scale-invariant features", Proceedings of the International Conference on Computer Vision. 2. pp. 1150-1157, 1999 and in U.S. Pat. No. 6,711,293 (both incorporated herein by reference).

As an alternative, the descriptor may be generated using the so-called Speeded Up Robust Features (SURF) technique. SURF approximates the gradient extraction by using integral images, which results in different weighting of the surrounding pixels. SURF has a similar approach to SIFT, but tries to approximate the underlying computations with integral images as much as possible. In typical images, the SURF features seem to be very dense (several thousands of SURF features instead of hundreds in the case of SIFT) so the features may be reduced by taking only the top 500 with the highest maxima or minima in scale space.

As another alternative, the descriptor may be generated using the MSER technique.

The position data 41 representing the positions of the features and the descriptor data 42 representing descriptors derived in respect of a given image in step S3 may be stored by the processing unit 28 in the memory 28. In that case, when the method is performed repeatedly, the pre-processing of step S3 in respect of a given image may retrieve the position data 41 and the descriptor data 42 stored in the memory 28 if that image has already been pre-processed in a previous performance of the method. That will generally be the case for the designator image, and may be the case for earlier images intermediate the current image and the designator image. This reduces processing by avoiding repetition of steps S31 and S32.

In step S4, corresponding descriptors generated in respect of different images in the plural images are detected. Step S4 operates on the sets of descriptors (commonly known as "vectors" since the descriptors have multiple dimensions) from each image of the plural images, typically several hundred from each.

Figure 8:
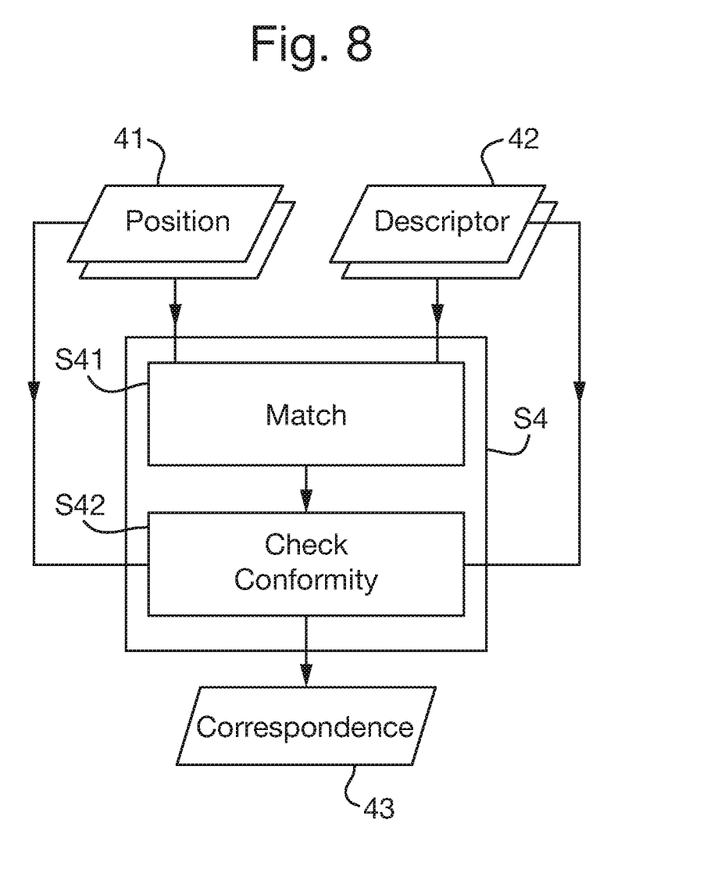
FIG. 8 is a detailed flowchart of steps S4 to S6 of the flow chart of FIG. 2.

Step S4 itself comprises two steps S41 and S42 as shown in FIG. 8.

In step S41, descriptors generated from the different images in the plural images that match are detected. Matching may be determined using any measure of proximity, for example a distance function, and classifying a match where the measure of proximity indicates similarity above a threshold, that may be fixed or may be adaptively determined to obtain a reasonable number of matches. For efficiency, an approximate-nearest-neighbour data structure may be used. One option is to use the approach disclosed in Muja and Lowe, "Fast approximate nearest neighbors with automatic algorithm configuration", International Conference on Computer Vision Theory and Application VISSAPP '09, pages 331-340. INSTICC Press, 2009 (incorporated herein by reference). Using the principles of hash-tables, proximity can be quickly established but might yield false positives.

Figure 9:
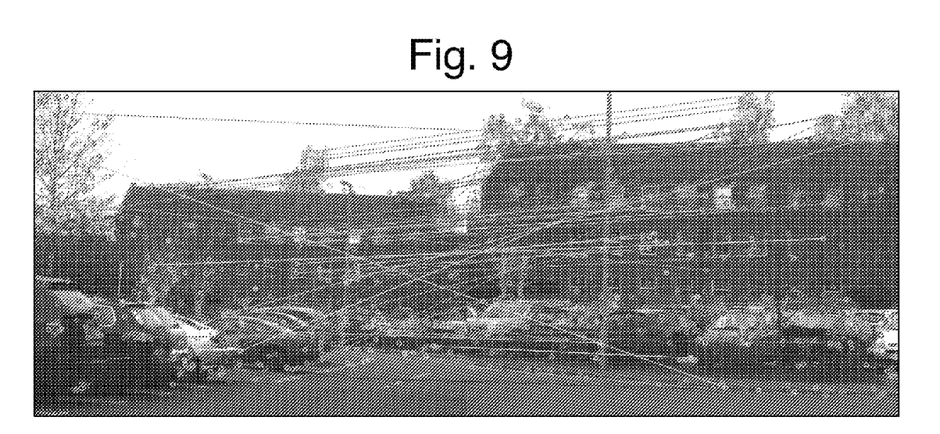
FIG. 9 shows the images of FIG. 5 with matching features identified by lines.
Figure 10:
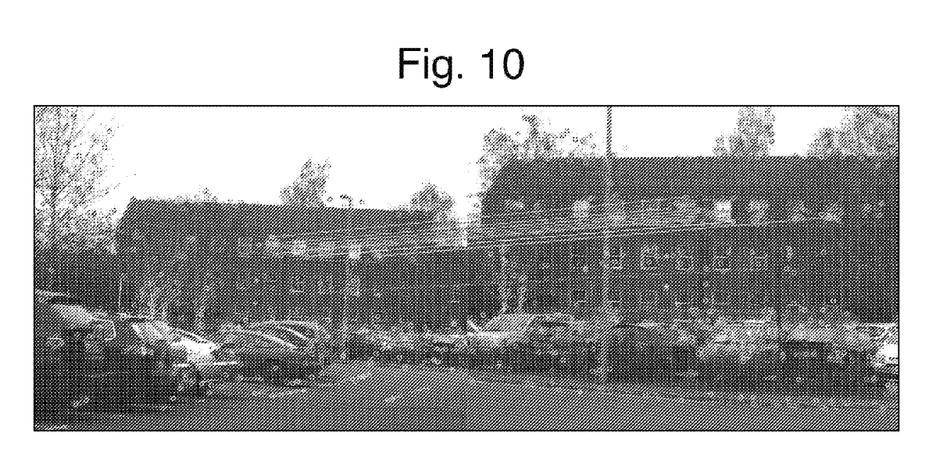
FIG. 10 shows the images of FIG. 5 with corresponding features identified by lines.

Step S41 is performed without reference to the position of the features to which the descriptors correspond, and so may be considered as putative. The aim is to detect pairs of descriptors in different images which are very similar. This indicates a high probability that the pair of descriptors come from corresponding locations in each image. However, matches are inevitably also found for pairs of patches which look alike but which are not from the same part of the scene. This is illustrated for the example images in FIG. 9 where lines are drawn between the matching features in the plural images (that are themselves identified in FIG. 6). Herein, the lines connecting features which can be visually determined to have been correctly identified as corresponding are generally parallel ('inliers') and the lines connecting features which can be visually determined to have been incorrectly identified as corresponding ('outliers') are at acute angles thereto.

Accordingly, to remove the outliers, in step S42, from the matching pairs of descriptors there are determined pairs of descriptors that also conform to a common mapping between the positions in the respective images of the features corresponding to those descriptors. That is, the relative locations of the corresponding features are tested for geometrical consistency. For example, a homography (the relative 2-dimensional ordering of features remaining unchanged between the plural images) indicates that the matching features lie on a planar surface within the scene.

In step S42, the feature matching is constrained to a subset of physically viable solutions. This can happen a priori by mathematical constraints, or a posteriori by removing solutions that are mathematically correct, but highly unlikely. The latter is obtained by a check for convexity of the transformed image coordinates: the current image view is expected to have no twists (no points in the neighbourhood of the centre in the current image view are mapped to infinity). In a second implementation, this can be obtained mathematically through constrained optimization (quadratic programming).

One approach is to use a variant of a robust estimator, RANdom Sampling And Consensus (RANSAC), in the form proposed in Torr and. Zisserman, "MLESAC: A new robust estimator with application to estimating image geometry", Computer Vision and Image Understanding, 78:138-156, 2000 (incorporated herein by reference). The method works by making the assumption that an underlying mapping governs the matches. Here, for a subset of all matches, the image points in a first image can be related to the ones from a second image, and vice versa. Random Sampling and Consensus works by selecting the minimum amount of matches required to solve for a mapping. With the solution from this minimal set, the matches are classified as inliers if their error lies below a certain threshold, or as outliers otherwise. In the original version, the mapping is chosen that results in most inliers. Use of a mapping that minimizes the robust errors, i.e. a better overall fit of a smaller number of inliers can be better than a poor fit to many.

In the simplest case where the points in a scene lie on a physical plane or are at a sufficient distance from the observer that there is little or no parallax between the images being compared, the mapping that governs a projective transformation of points is called a homography, that is when $x_2$ is approximately $Hx_1$ where image points of the positions $x_1$ and $x_2$ in two of the plural images are specified in homogeneous coordinates and the mapping H belongs to $R^{3 \times 3}$. The elements of H can be solved for explicitly, yielding a 2N×9 equation system $Ah=0_{2N}$:

With the constraint of scale independence of H, this and requires at least N=4 matching points. Further details can be found in Hartley and Zisserman, "Multiple View Geometry in computer vision", Cambridge University Press, Second Edition, 2003 (which is incorporated herein by reference). In one implementation, the putative matches obtained in the previous step are the input to this method, and the outlier threshold is set conservatively to 3 pixels (relative to a 640×480 pixel image).

In case the majority of points come from invalid matches, the RANSAC method can result in the wrong final match. We address this by removing invalid homographies. The homography found in the RANSAC step is applied to a set of points around the centre of the designator image. If the mapped points result in a non-convex polygon or corners too acute, the match is rejected. This is equivalent to a constraint on positive definiteness or putting linear constraints on the homography's parameters, which can be solved using semi-definite programming techniques, but as we deal with video data, we found the rejection step sufficient.

Step S42 outputs the correspondence data 43 representing the corresponding descriptors from the different images that correspond to each other. Where the number of correspondences between the features of the plural images is high relative to local feature density, there is a strong likelihood that the images overlap.

The correspondence data 43 representing the corresponding descriptors derived in step S4 may be stored by the processing unit 28 in the memory 28. In that case, when the method is performed repeatedly, the processing of step S4 may retrieve and make partial use of the correspondence data 43 stored in the memory 28 if correspondence between some of the plural image has already been considered in a previous performance of the method.

In step S5, the geometric calibration of the camera unit 21 with respect to the scene at the current time and at the image-capture time of the designator image is derived from the positions in the respective images of the features corresponding to the detected corresponding descriptors generated in respect of the plural images. Step S5 outputs calibration data 44 representing the geometric calibration. Step S5 uses the correspondence data 43 representing the descriptors that correspond in the plural images, and also the position data 41 that represents the positions of the features corresponding to those descriptors. In the option that the plural images include further, earlier images captured at an image-capture time earlier than the current time, in addition to the designator image, then step S5 uses the detected corresponding descriptors generated in respect of all of the plural images, but only needs to derive the geometric calibration of the camera unit 21 with respect to the scene at the current time and at the image-capture time of the designator image (although many mathematical techniques that can be applied might intrinsically derive the geometric calibration of the camera unit 21 with respect to the scene at the image-capture times of all of the plural images).

The geometric calibration of cameras is a concept which forms the basis of two technical disciplines, photogrammetry and visual geometry. In both cases, the objective is to determine the 3-dimensional positions of points in a scene, relative to two or more cameras, using epipolar geometry, whose principles are well known per se.

In general, the calibration of camera position and attitude ("pose"; extrinsic parameters) and lens properties (intrinsic parameters) for a pair of cameras can be made from fewer than a ten observations of points in the scene. With hundreds of observations, the calibration makes use of non-linear optimisation methods (bundle adjustment) to obtain the best solution. Calibrations can be obtained from points on a planar scene (a flat wall, or ground plane) or, with a slightly more complicated algorithm, from a general scene with features at different depths.

As mentioned earlier, in many cases the transformation between the plural views of the scene may be described by a simple homography, in which case the camera calibration for each view is straightforward. However, if a target is within a scene containing objects at variable depths relative to the camera unit 21 at the different image-capture times, it is possible that, due to parallax, the relative locations of matching features differs between the images being compared and may not form a homography. In this case the solution for the relative 3D angular locations and scale of the camera unit 21 at the different image-capture times can, in most cases, still be calculated.

Figure 11:
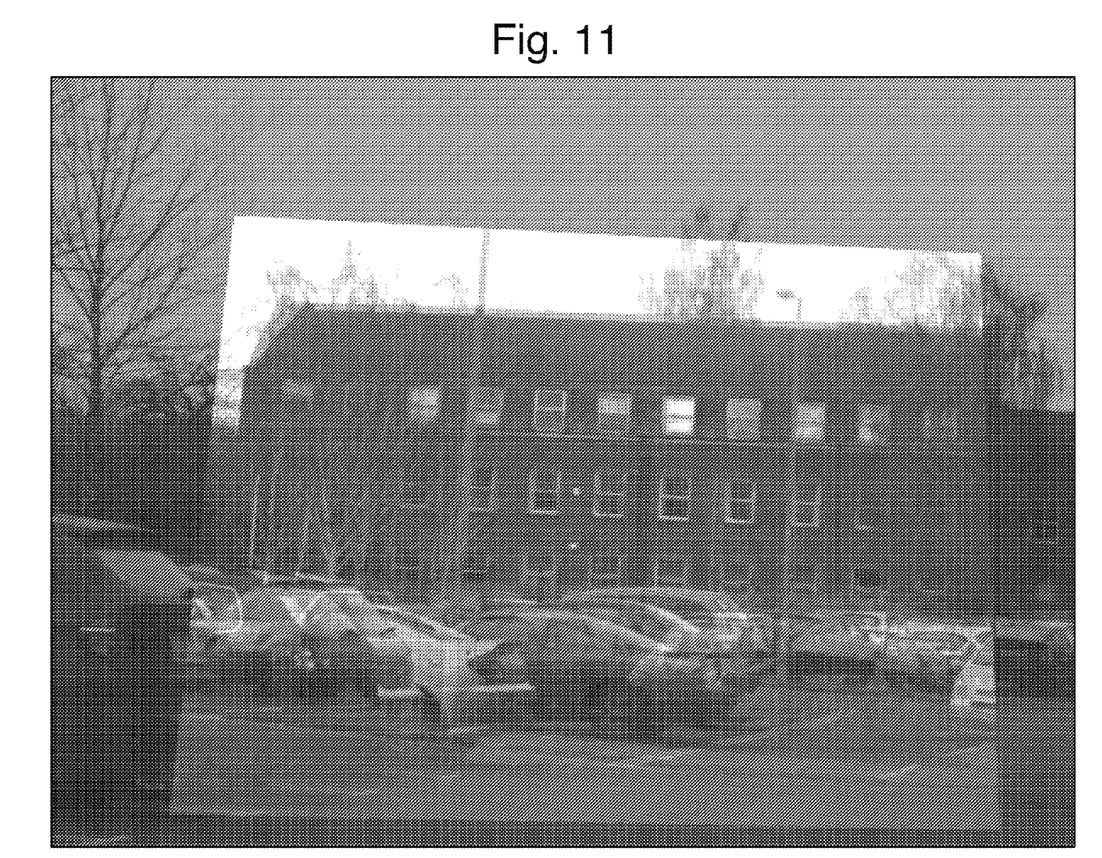
FIG. 11 shows the images of FIG. 5 overlaid after geometric calibration.

The geometric calibration effectively allows images to be overlaid, so far as they are images of overlapping portions of the same scene. In general, this will require the distortion of one of the images (known as "rectification"). This may only be possible for a small part of the image since other parts show elements of the scene in one camera which are not seen in the other. By way of example, FIG. 11 shows the images of FIG. 5 overlaid on each other after derivation of the geometric calibration therebetween.

Optionally, the optical sighting apparatus 2 may additionally include a sensor element 34 for estimating the current attitude and/or geographical position of the camera unit 21. The sensor element 34 may comprise a small, low-cost MEMS AHRS (Attitude and Reference system) that combines measurements from magnetometers, gyroscopes, accelerometers and the like to provide a dynamic estimate of current attitude. Static performance ultimately depends on measurements of the Earth's magnetic field which are susceptible to other magnetic field sources and distortions, and increasing dip angles away from the Equator. The net performance is typically of the order of +3 degrees of azimuth. The sensor element 34 may alternatively or additionally comprise a GPS receiver. A combined GPS/AHRS can provide camera geometry to give approximate direction but, in general, this would not be accurate enough for targeting. However, a GPS/AHRS is ideally suited to provide an approximate bearing.

Accordingly, the accuracy of the estimation in step S5 may be improved by using the output of the sensor element 34, if provided. The optical sighting apparatus 2 may also compare the geoposition and orientation information at the different image-capture times to compute an orientation vector, that may be indicated on the display device 26 of the seeker by a graphical overlay. This orientation display indicates to the user the general direction in which the camera unit 21 should be pointed in order to allow the optical sighting method to be performed.

The accuracy of estimation may also be improved by additionally deriving and using position data 41 and descriptor data 42 in respect of images captured by additional optical sighting apparatus 2 that form part of the system 1 and may be imaging the same scene.

In step S6, the target location in the current image captured at the current time is processed to identify, from the derived geometric calibration represented by the calibration data 44, the corresponding location relative to the designator image captured at an earlier image-capture time, that is the location in the current image that corresponds to a target location in the scene that itself corresponds to the target location in the designator image.

In general, the target location may be at any position in the designator image, and there may be any number of target locations.

In this embodiment, the target location is at a predetermined position in the designator image, known to the optical sighting apparatus 2, for example the central location of the designator image, or the boundary of the field of view of the camera unit 21 (i.e. the boundary of the designator image). As the geometric calibration represents the geometric relationship between the designator image and the current image, it is straightforward in step S6 to use this knowledge of the location of the target location in the first image to identify the corresponding location in the current image.

As an alternative, it is possible for the optical sighting apparatus 2 to allow user to provide user input, using the input device 30, that designates the position of the target location within the designator image captured and displayed on the display device 26, for example using a cursor on the display device 26. In that case, the position of the target location in the designator image is stored in the memory 28.

In step S7, there is displayed on the display device 26 the current image, together with an indication of where the corresponding location lies relative to the current image, for example by displaying an appropriate overlay thereon.

Figure 12:
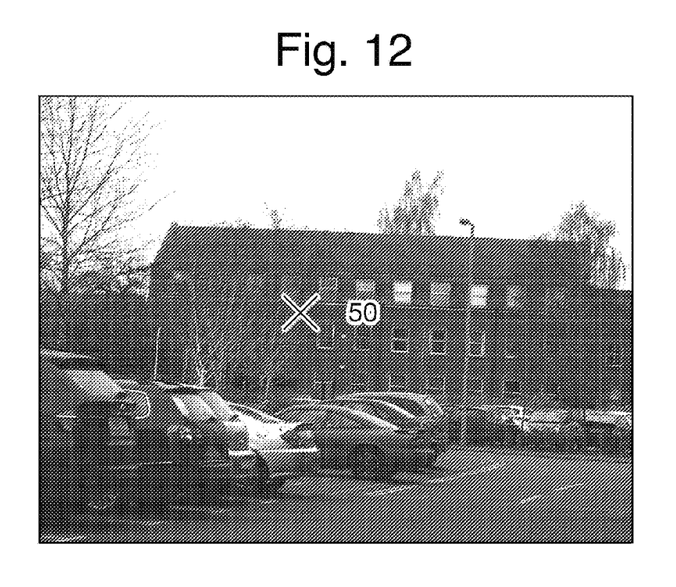
FIGS. 12 and 13 show the current image of FIG. 5 with an indication of the location corresponding to a target location on the designator image.

In the event that the corresponding location is inside the field of view of the camera unit 21 at the current time, then the corresponding location may be indicated by superimposing a graphical element directly on the displayed image, for example crosshairs if the target location is the central location of the designator image or a quadrilateral shape if the target location is the boundary of the designator image (i.e. the rectangular boundary with appropriate distortion). By way of example, FIG. 12 shows a typical current image having superimposed thereon a crosshairs 50 as an example of a graphical element that directly indicates the corresponding location in the case that it is inside the field of view.

Figure 13:
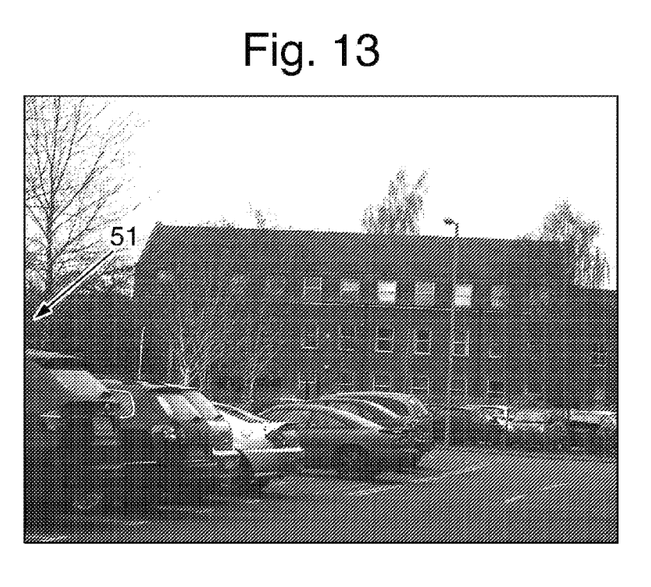

However, it is a particular advantage that it is not necessary for the corresponding location to be inside the field of view of the lens system 22 at the time the current image is captured, after the image-capture time of the designator image. The assisted optical sighting may still be performed in the case that the corresponding location is outside the field of view of the lens system 22 at the current time, provided that there is sufficient overlap between the portions of the scene imaged by the plural images processed in the method to allow the geometrical calibration to be performed. In this case, the corresponding location may be indicated by displaying a pointer towards the corresponding location, and optionally a distance measure. By way of example, FIG. 13 shows a typical current image having superimposed thereon an arrow 51 as an example of a graphical element that is a pointer indicating the corresponding location in the case that it is outside the field of view.

In either case, when observing the current image, the user is made aware of the target that was previously observed in the designator image. That allows the user to change the field of view of the camera unit 21, for example by changing the pan, tilt or zoom (PZT) of the camera unit, so as to image the corresponding location if outside the field of view or to centralise and/or zoom in on the corresponding location. During such adjustment, the method may be performed repeatedly so as to update the position of the corresponding location on the current image displayed on the display device 26. Because the detection of features and generation of descriptors is scale invariant, the target identification should be sustained. At the end of this process, the camera unit 21 is aimed at the same target within the scene that was previously designated in the designator image.

It is a particular advantage that the method still works in the case that an object, that was present at the target location at the time the user designates it in the designator image, disappears by the image-capture time of the current image. As the method makes use of features across the entirety of the image, rather than relying on image information about the object itself, the target location may still be identified. This allows the user to record and return to the target location even when an object of interest has disappeared.

It is possible that a complete geometrical solution cannot be found in step S5 due to insufficient overlap between the portions 24 of the scene 25 being imaged in the plural images (bearing in mind that in general the optical sighting apparatus 2 could be imaging entirely unrelated scenes at the different image-capture times if it is moved to a different geographical location and/or pointed in a different direction). In that case, any corresponding features between the designator image and the current image can nonetheless be displayed to on the display device 26, allowing the optical sighting apparatus 2 to focus attention on the region of the current image containing the correspondences. The user may then change the field of view of the camera unit 21 to increase the number of features displayed (e.g. by panning towards them and/or widening the field of view). In that way, the proportion of feature correspondences subject to parallax can be reduced making it easier to perform the geometric calibration.

Throughout the performance of the method, both the optical sighting apparatus 2 may display a graphical overlay on the display device 26 to indicate the status of the optical sighting method, for example the location and identity of matching features, the field of view, and the state of user controls.

The above described method is performed on plural images all captured by the optical sighting apparatus 2. In addition, the optical sighting apparatus 2 may be capable of performing a similar method on one or more image captured by the optical sighting apparatus 2 and one or more other optical sighting apparatus. In this case, communication of necessary data between the optical sighting apparatus 2 and any other optical sighting apparatus (and optionally a central processing apparatus) occurs over the communications network 4 using the communications interface 27. An example of such a method is described in International Patent Appl. No. PCT/GB2013/051102 filed 30 Apr. 2013 (J A Kemp Ref: N116664A-WO).

Figure 14:
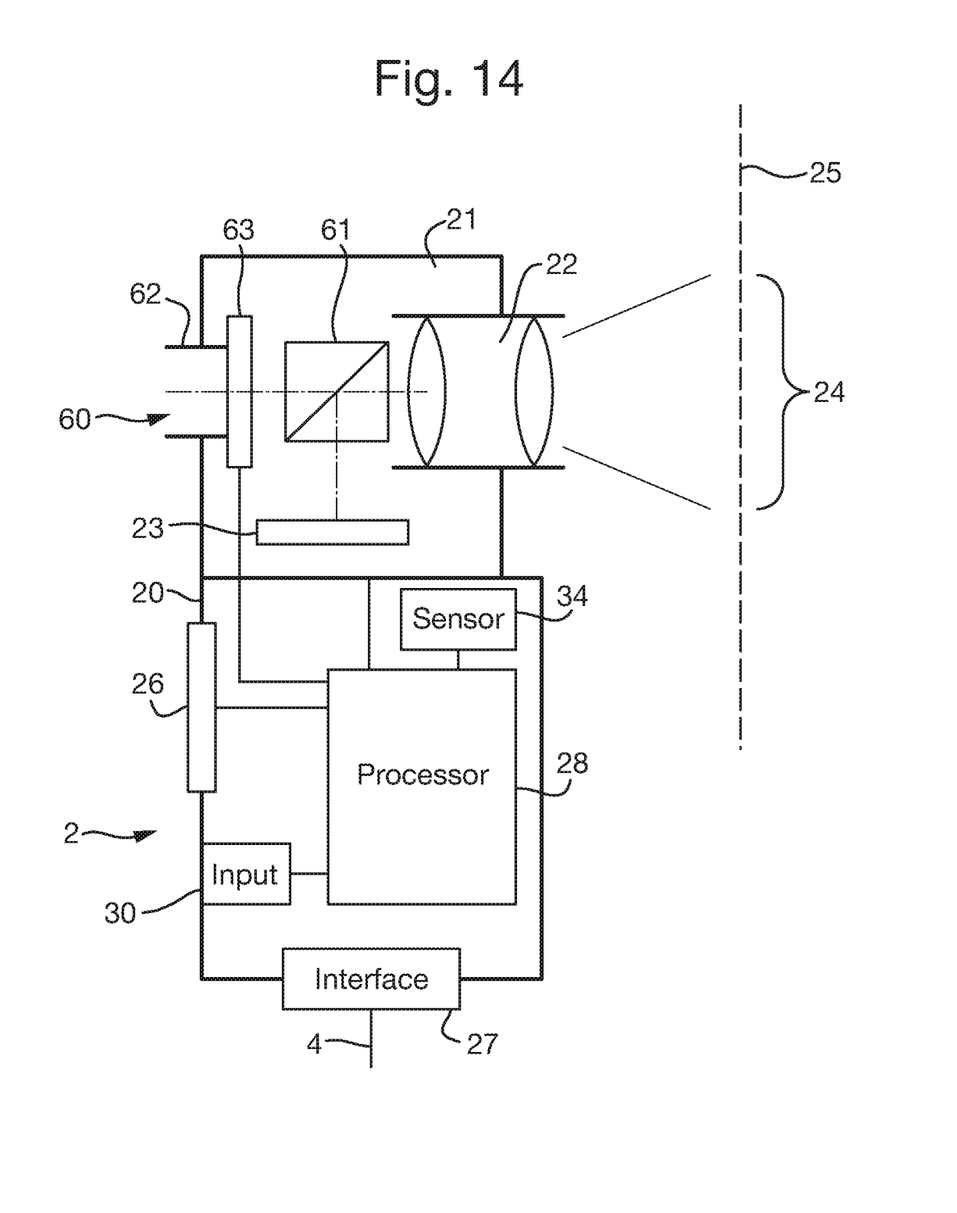
FIG. 14 is a diagram of an optical sighting apparatus having a modified viewing system.

FIG. 14 illustrates the optical sighting apparatus 2 in which a modification is made to the form of the viewing system. In particular, the display device 26 is not used as the viewing system for providing viewing of images, and instead there is an optical viewing system 60 arranged as follows. Apart from the following modification, the optical sighting apparatus shown in FIG. 14 has the same arrangement as set out above and for brevity a description thereof is not repeated.

The optical viewing system 60 comprises an optical splitter 61 that is arranged to split the light from the lens system 22 to the image sensor 23 and to an optical viewer 62. The optical splitter 61 and optical viewer 62 may be formed by conventional optical components. Thus the image sensor 23 continues to operate as described above and the optical viewer 62 provides for viewing by the user of the current image focussed by the lens system 22 optically, in a similar manner to a telescope or binoculars.

In addition, the optical viewing system 60 comprises an overlay display 63 that overlays a display on the image viewed by the user in the optical viewer 62. The overlay display 63 may have a conventional arrangement. In use, the overlay display 63 is used to indicate the location in the current image that corresponds to the target location in the designator image. In particular, in the method described above, step S7 is changed to be a step of displaying on the overlay display 63 an indication of where the corresponding location lies relative to the current image, as viewed by the user in the optical viewer 62. The indication on the overlay display may take the same visual form as the overlay on the display device 26 as described above.

The invention claimed is:

1. A method of optical sighting implemented in an optical sighting apparatus that comprises:
   a camera unit comprising a lens system arranged to focus images of respective portions of a scene within the field of view of the lens system, and an image sensor arranged to capture images focused by the lens system; and a viewing system arranged to provide viewing by a user of the images focused by the lens system, the method comprising:
   detecting features within each of plural images captured by the image sensor, being the current image captured at the current time and one or more earlier images captured at earlier image-capture times;
   generating descriptors in respect of each of the plural images from patches of the respective images at the positions of each detected feature;
   detecting corresponding descriptors generated in respect of the plural images;
   deriving the geometric calibration of the camera unit at the current time and at the image-capture time of one of the one or more earlier images, referred to as a designator image, with respect to the scene from the positions in the respective images of the features corresponding to the detected, corresponding descriptors generated in respect of the plural images;
   in respect of at least one target location in the designator image, identifying, from the derived geometric calibration of the camera unit at the current time and at the image-capture time of the designator image, a corresponding location relative to the current image that corresponds to a target location in the scene that itself corresponds to the target location in the designator image; and
   indicating in the viewing system where the corresponding location lies relative to the current image.

2. The method according to claim 1 wherein, in the case that the target location in the scene that corresponds to the target location in the designator image is outside the field of view of the lens system at the current time, the step of indicating in the viewing system where the corresponding location lies relative to the current image comprises displaying a pointer towards the corresponding location.

3. The method according to claim 1, wherein at least one target location in the designator image is at a predetermined position within that image.

4. The method according to claim 1, wherein the designator image is selected on the basis of user input.

5. The method according to claim 1, wherein the one or more earlier images consist of one earlier image.

6. The method according to claim 1, wherein the optical sighting apparatus further comprises a housing in which the camera unit and the viewing system are housed.

7. The method according to claim 1, wherein the step of detecting features comprises detecting features with scale-invariance and rotation-invariance.

8. The method according to claim 1, wherein the step of generating descriptors comprises generating descriptors with scale-invariance and rotation-invariance.

9. The method according to claim 1, wherein the step of detecting features comprises detecting maxima and/or minima in the differences between different scale spaces of the respective images.

10. The method according to claim 1, wherein the step of generating descriptors comprises generating descriptors from patches of the respective images in scale space of the respective images in which maxima and/or minima in the differences of samples is detected.

11. The method according to claim 1, wherein the step of generating descriptors comprises generating descriptors from patches of the respective images around each detected feature that are each oriented to the dominant gradient in the respective patches.

12. The method according to claim 1, wherein the descriptors comprise histograms of image gradients in different directions across the respective positions of the detected features.

13. The method according to claim 1, wherein the step of detecting corresponding descriptors generated in respect of the plural images comprises detecting descriptors generated from the plural images that match each other and that conform to a common mapping between the positions in the plural images of the features corresponding to those descriptors.

14. The method according to claim 1, wherein the step of deriving the geometric calibration of the camera units with respect to the scene uses non-linear optimisation.

15. The method according to claim 1, wherein the viewing system comprises a display device arranged to display images captured by the image sensor to provide viewing by a user.

16. The method according to claim 1, wherein the viewing system comprises:
   an optical viewer arranged to provide viewing by a user of the images focused by the lens system optically; and
   an overlay display arranged to overlay a display on the viewed image, the step of indicating in the viewing system where the corresponding location lies relative to the current image comprising displaying an indication on the overlay display of where the corresponding location lies relative to the current image.

17. The method according to claim 1, wherein the optical sighting apparatus is a mobile optical sighting apparatus.

18. An optical sighting apparatus for performing optical sighting, comprising:
   a camera unit comprising a lens system arranged to focus images of respective portions of a scene within the field of view of the lens system, and an image sensor arranged to capture images focused by the lens system;
   a viewing system arranged to provide viewing of the images focused by the lens system by a user; and
   a processing unit, wherein the processing unit is configured to:
   detect features within each of plural images captured by the image sensor, being the current image captured at the current time and one or more earlier images captured at earlier image-capture times;
   generate descriptors in respect of each of the plural images from patches of the respective images at the positions of each detected feature;

detect corresponding descriptors generated in respect of the plural images;
derive the geometric calibration of the camera unit at the current time and at the image-capture time of one of the one or more earlier images, referred to as a designator image, with respect to the scene from the positions in the respective images of the features corresponding to the detected, corresponding descriptors generated in respect of the plural images;
in respect of at least one target location in the designator image, identify, from the derived geometric calibration of the camera unit at the current time and at the image-capture time of the designator image, a corresponding location relative to the current image that corresponds to a target location in the scene that itself corresponds to the target location in the designator image; and
control the viewing system to indicate where the corresponding location lies relative to the current image.

* * * * *